United States Patent [19]

Moore

[11] Patent Number: 4,790,458
[45] Date of Patent: Dec. 13, 1988

[54] FOLLOWER PLATE SEAL

[75] Inventor: Leo M. Moore, Chesterfield, Va.

[73] Assignee: Industrial Machine Manufacturing, Inc., Richmond, Va.

[21] Appl. No.: 95,117

[22] Filed: Sep. 11, 1987

[51] Int. Cl.$^4$ .............................................. B67D 5/62
[52] U.S. Cl. ................................ 222/386; 222/146.5; 220/93
[58] Field of Search ............... 222/146.1, 146.5, 386, 222/387–389; 220/93; 277/170–172, 168, 216

[56] References Cited

U.S. PATENT DOCUMENTS

| | | | |
|---|---|---|---|
| 1,381,993 | 6/1921 | Hill et al. | 277/171 |
| 2,704,650 | 3/1955 | Rand | 277/168 X |
| 3,184,247 | 5/1965 | Leutwyler | 277/170 |
| 3,282,469 | 11/1966 | Skonberg | 222/146.5 |
| 3,412,903 | 11/1968 | Van Riper, Jr. et al. | 222/146.5 |
| 3,637,111 | 1/1972 | McCreary | 222/146.2 |
| 3,758,003 | 9/1973 | Kautz et al. | 222/146.1 |
| 3,976,229 | 9/1976 | Jackson | 222/146.5 |
| 3,982,669 | 9/1976 | Moore | 222/146.5 |
| 4,073,409 | 2/1978 | Gardner et al. | 222/146.5 |
| 4,090,640 | 5/1978 | Smith et al. | 222/52 |
| 4,195,755 | 4/1980 | Slautterback et al. | 222/146.5 |
| 4,227,069 | 10/1980 | Gardner et al. | 219/421 |
| 4,240,567 | 12/1980 | Gardner | 222/146.5 |
| 4,270,674 | 6/1981 | Moore | 222/146.5 |
| 4,344,547 | 8/1982 | Moore | 222/146.5 |
| 4,355,734 | 10/1982 | Moore | 222/63 |
| 4,534,493 | 8/1985 | Sedran | 222/146.2 |
| 4,592,491 | 6/1986 | Chollet | 222/146.5 |
| 4,632,281 | 12/1986 | Wold | 222/389 |
| 4,635,820 | 6/1987 | Marshall | 222/63 |
| 4,661,688 | 4/1987 | Gabryszewski | 219/421 |

FOREIGN PATENT DOCUMENTS 973135 11/1959 Fed. Rep. of Germany ...... 277/216

Primary Examiner—Michael S. Huppert
Attorney, Agent, or Firm—Witherspoon & Hargest

[57] ABSTRACT

Apparatus for dispensing materials from a container using a follower plate having at least one improved discontinuous resilient wiper and associated retaining groove.

12 Claims, 3 Drawing Sheets

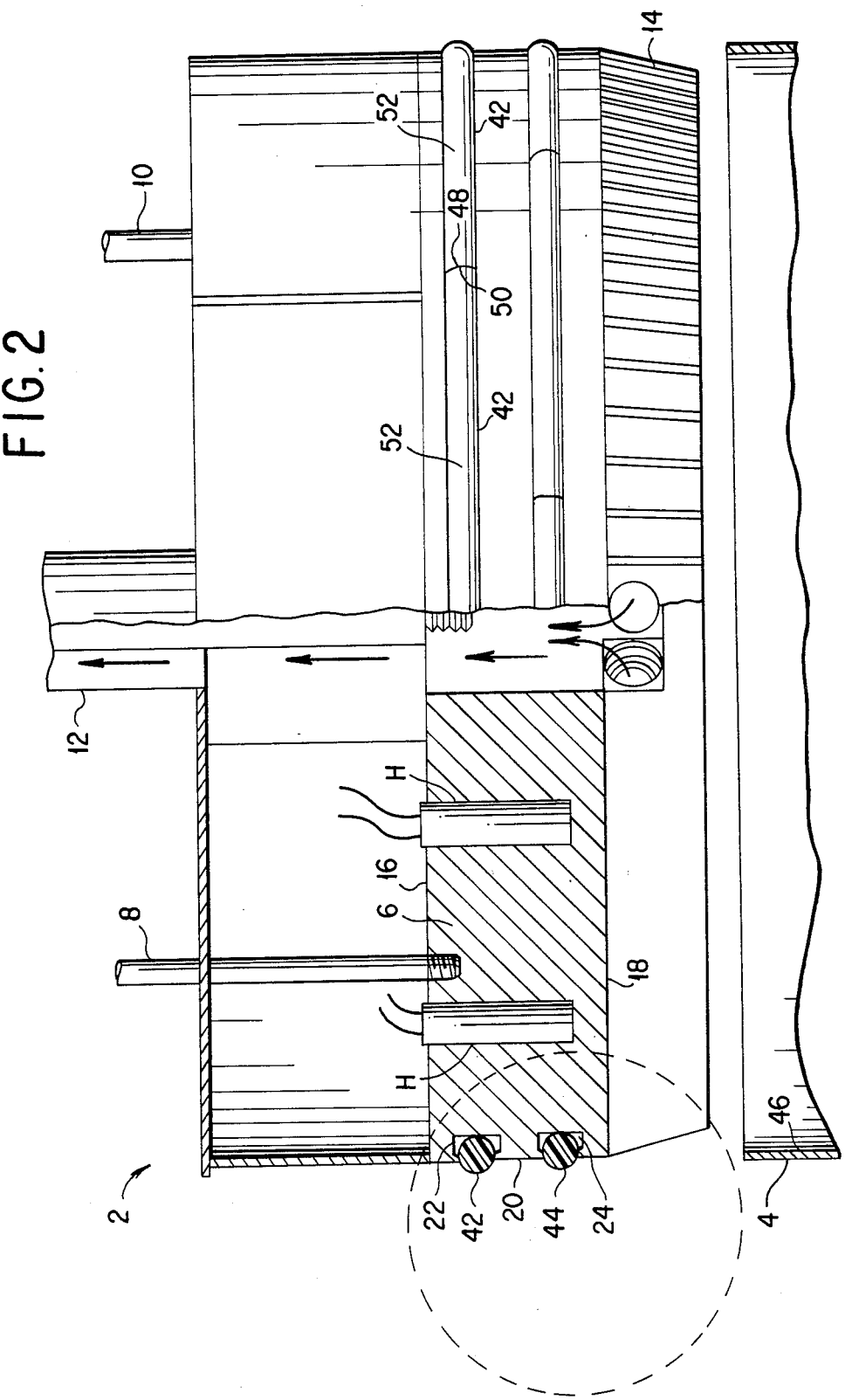

FOLLOWER PLATE SEAL

BACKGROUND OF THE INVENTION

1. Field of the Invention

The invention relates to dispensing materials from a container using apparatus including a follower plate which is lowered into the container housing the material to be dispensed. In particular, the invention relates to improved sealing means for use in preventing leakage of such material at the interface of the plate and the inner wall or surface of the container as the plate is being lowered into the container in a known manner.

2. Description of the Prior Art

The viscosity of materials to be dispensed using apparatus of the present invention varies depending upon the specific application, and it is not unusual to find materials which are not particularly viscous and are substantially free flowing. On the other hand in certain applications such materials may be extremely viscous and require the application of considerable heat and/or pressure in order to render such materials dispensable. The present invention is applicable to apparatus for dispensing highly viscous materials and also useful with substantially free flowing materials.

In one form of apparatus of the type contemplated by the present invention a plate is caused to reciprocate into and out of the open end of a drum-like container housing the material to be dispensed. Examples of such a plate are disclosed in Moore, U.S. Pat. Nos. 4,270,674 and 4,344,547. In operation, as the plate enters the drum it engages the inside surface of the drum and the material therein. As the plate travels towards the closed base of the drum it causes the material sandwiched or pressured therebetween to be dispensed, as for example, by forcing the material through an opening in the plate. Such dispensing may be facilitated by means of a pump associated with such opening to pump the material therethrough as the plate is lowered into the drum. The dispensing operation may be further facilitated by applying heat to the material within the drum. This may be accomplished by, for example, utilizing a plate which includes a heating element affixed thereto or disposed internal thereof. In some instances the material may be so highly viscous as to require the combination of such heat, pressure and pumping action to adequately dispense the material. Examples of a dispensing apparatus which may rely upon heat, pressure and pumping is disclosed in Moore, U.S. Pat. Nos. 3,982,699 and 4,355,734.

As the plate is lowered into the drum and engages the material, there is a tendency for the material to flow from the bottom of the plate over the top of the plate at the peripheral surface or edge thereof where the plate is adjacent to the inside surface of the drum. For example, in those instances where the plate is cylindrical and is caused to extend into a cylindrical drum for purposes of dispensing material from within the drum, there is a tendency for the material to flow or leak between the outer periphery of the cylindrical plate and the inside surface of the drum. In order to prevent such leakage and to direct substantially all of the material through the dispensing opening in the plate, sealing means or wipers have been used. For example, the cylindrical plate discussed above may be encircled with one of more resilient sealing means which serve to scrape the inside surface of the drum and also to prevent or reduce leakage at the interface between the inside surface of the drum and the periphery of the plate. Such wipers generally are single piece, O-ring-like resilient seals, either solid or inflated, which are stretched over the end of the plate and caused to seat in an associated groove which extends about the peripheral surface of the plate. Examples of such wipers are disclosed in U.S. Pat. Nos. 3,282,469; 3,412,903; 3,637,111; 3,758,003; 3,976,229; 4,073,409; 4,227,069; 4,195,755; 4,240,567; 4,534,493; 4,592,491; 4,635,820; and, 4,661,688.

There are a number of problems associated with the use of such wipers. For example, optimally, the wiper should rotate or roll along the internal wall of the container during movement within the container. However, there is a tendency for such prior art wipers to twist apart and fall off of the plate during use due to the nature of the synthetic or other resilient materials used in making such sealing means, the configuration of the groove, and the configuration of the container from which material is being dispensed. In particular, there is a tendency for one portion of the wiper to become flattened and thereby prevented from rolling while the remaining portion of the wiper is free to roll. Such might occur, for example, in those instances where the container has been deformed or is otherwise bent out of shape. The result will be that the rolling portion of the wiper will twist off or sever from the flattened non-rolling portion and will fall out of the groove as the plate reciprocates relative to the container.

Other problems involve routine wear and tear, as well as unexpected damage which results from the abrasive environment, and often high temperatures, to which such wipers are subjected. For example, replacement of such wipers often requires stretching a new wiper over the end of a very hot plate, or waiting until such plate cools, both being undesirable alternatives. In addition, damage involves replacement of the entire wiper.

In U.S. Pat. No. 4,090,640, the use of a segmented metallic seal has been proposed to obtain a piston-like seal. However, such seals do not provide the desired rolling action, the individual metal segments being polygonal in cross-section and fastened to one another at adjacent ends by means of connecting pins.

As a result of the high temperatures encountered in some applications, there is a tendency for the wiper to expand and fall out of its associated groove. One means to prevent this from occurring involves the use of a seal retaining clip such as is disclosed in U.S. Pat. No. 4,632,281. This is an undesirable approach at least to the extent that additional hardware is required. Another means to prevent this problem from occurring involves the use of wipers which are stretched over the plate and into the groove, such wipers obviously being subjected to great tension. This is also undesirable in that if such a wiper is cut during use of otherwise, the wiper will vary rapidly tear to such an extent as to require replacement.

Accordingly, it is an object of this invention to provide apparatus for dispensing material using a follower plate having a resilient sealing means which does not twist apart and fall off of the plate during use.

Another object of this invention is to provide apparatus for dispensing material from a container using a follower plate having a resilient sealing means which rolls upon the inside wall of the container during use and wherein any undesirable prevention from rolling of a portion of such sealing means will not affect the rolling motion of any other portion such sealing means.

Still another object of this invention is to provide apparatus for dispensing material from a container using a follower plate having resilient sealing means which can be readily replaced whether the plate is cold or hot without stretching or otherwise tensioning the sealing means during installation or use.

A further object of this invention is to provide apparatus for dispensing material from a container using a follower plate having resilient sealing means which does not require total replacement when only a portion is in need of repair.

Still of further object of this invention is to provide apparatus for dispensing material from a container using a follower plate having resilient sealing means with abutting ends which do not need to be fastened to one another.

Yet another object of this invention is to provide apparatus for dispensing material from a container using a follower plate having resilient sealing means which does not require separate hardware such as a retaining clip to hold the sealing means in its associated groove.

SUMMARY OF THE INVENTION

This invention achieves these and other objects by providing an apparatus for use in dispensing including a plate shaped to fit inside a container of dispensable material, the plate having an upper surface, a lower surface and a side surface which extends from the upper surface to the lower surface. At least one groove in the side surface extends around the periphery of the plate, such groove including a base and a pair of opposing side walls extending from the base towards the side surface. One of the opposing side walls has an end opposite the base including a first retaining surface, and the other of the opposing side walls has an end opposite the base including a second retaining surface. The first and second retaining surfaces are spaced from each other to form a groove opening which extends about the periphery of the plate. At least one resilient member is provided having a first end, a second end, and a body portion extends therebetween. The member is retained in the groove by the first and second retaining surfaces and protrudes from the groove opening. The interrelationship between the groove and the member is such that a portion of the member protruding from the groove opening sealingly engages an inner wall of the container, and a portion of the member in the groove sealingly engages the base and at least one of the retaining surfaces, when the plate is positioned in the container. Respective of the portions of the member roll upon the inner wall, the base and at least one of the retaining surfaces when the plate is being lowered into the container or raised out of the container.

BRIEF DESCRIPTION OF THE DRAWINGS

FIG. 2 is an enlarged cross section view taken along the lines 2—2 of FIG. 1;

DESCRIPTION OF THE PREFERRED EMBODIMENT

Figure 1:
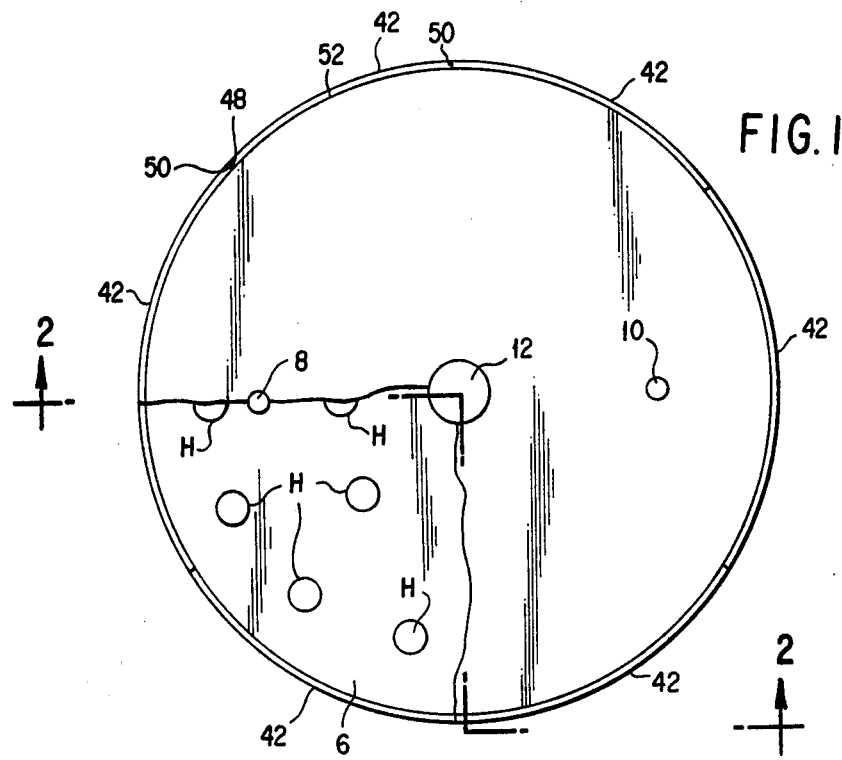
FIG. 1 is a top view of one embodiment of the apparatus of the present invention.
Figure 3:
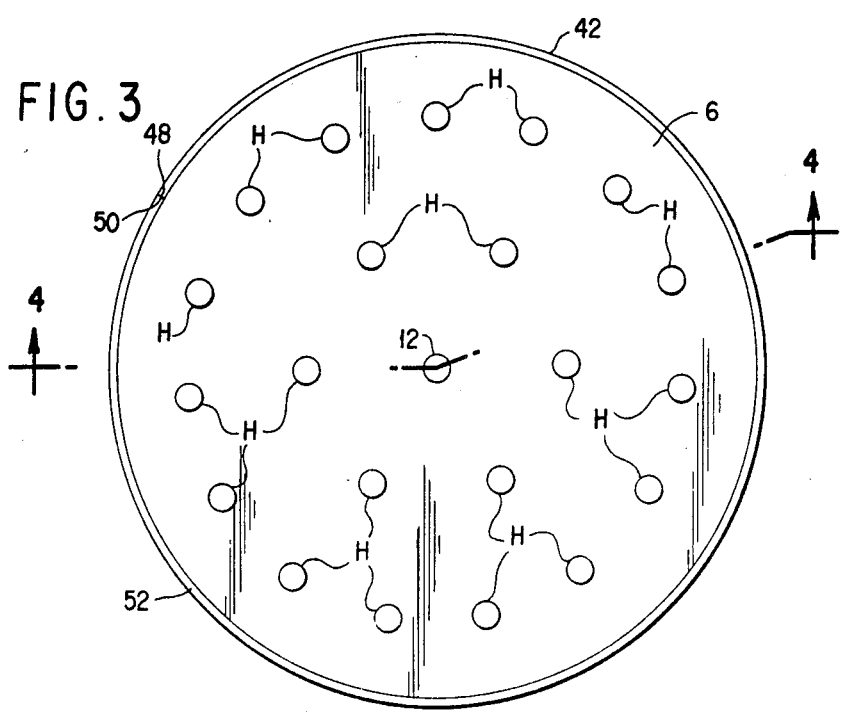
FIG. 3 is a top view of an alternate embodiment of the apparatus of the present invention.
Figure 4:
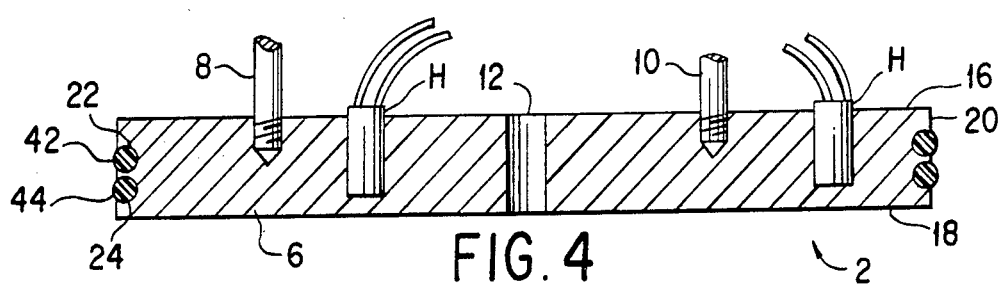
FIG. 4 is a cross-section view taken along the lines 4—4 of FIG. 3.
Figure 5A:
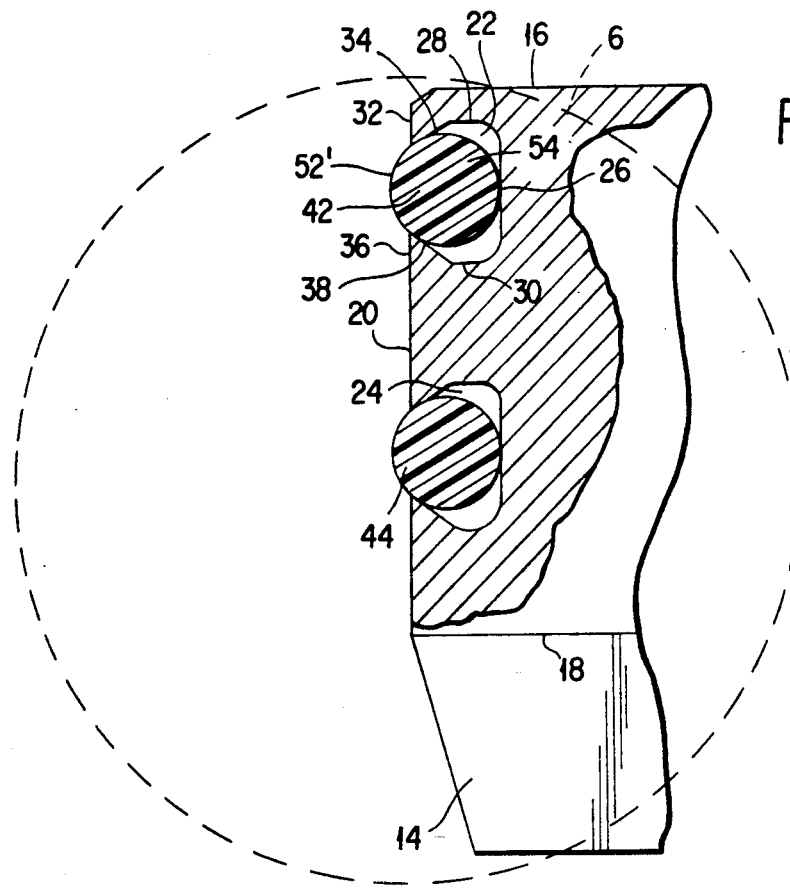
FIGS. 5A and 5B are enlarged views of the circled portion identified in FIG. 2.
Figure 5B:
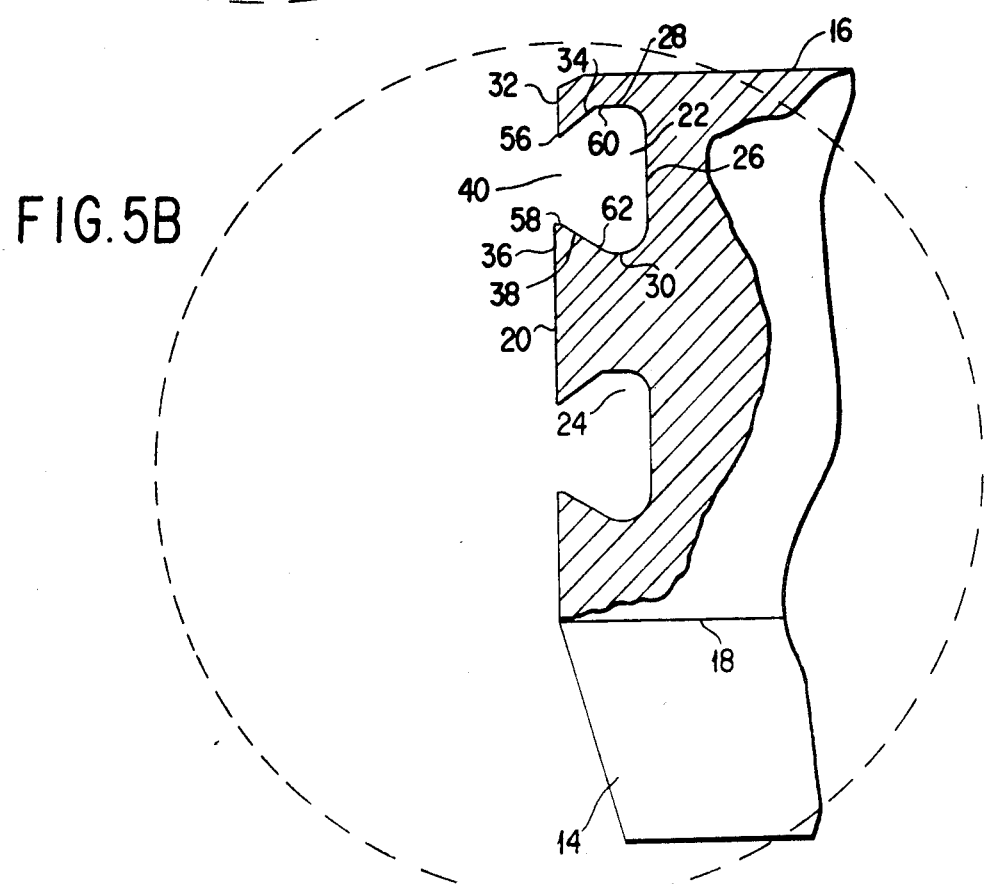

The embodiment of this invention which is depicted in FIGS. 1 to 5 is one which is particularly suited for achieving the objects of this invention, and like reference numerals designate like parts. FIGS. 1, 2 and 5 depict an apparatus 2 for dispensing material from a container 4 in a known manner. For example, in the dispensing of a hot melt material from container 4, an integrally fabricated combination heater-follower plate 6 is lowered into the container by a pair of rods 8 and 10. The rods permit the heated plate to move down into the container as the material is melted by the plate and dispensed from the container through outlet 12. In the preferred embodiment heat radiating fins 14 are coupled to, or integral with, and extend from the bottom of plate 6 to form an integral heated follower member for dispensing the hot melt material. Such structure is well known in the art as exemplified by the Moore patents referred to above. However it should be noted that the present invention is not limited to use with material which must be heated before dispensing; that is, the present invention is equally applicable in the dispensing of material which is in liquid form regardless of whether having been heated. Further, the present invention contemplates the use of a follower plate with heat radiating fins such as depicted in FIGS. 1 and 2 or without heat radiating fins such as depicted in FIGS. 3 and 4, and with or without heating means such as heating cartridges H.

In the hot melt dispenser depicted in the drawings the integral plate 6 and fins 14 are heat conducting material such as aluminum. Plate 6 is shaped to fit inside of the container 4. For example, container 4 is depicted as a cylindrical drum, and the plate and fins are piston-like. Plate 6 includes an upper surface 16, a lower surface 18 and a side surface 20 which extends from the upper surface to the lower surface.

At least one groove is provided in the side surface, such groove extending around the periphery of the plate. For example, grooves 22 and 24 are provided in surface 20 and extend around the periphery of plate 6. Although not necessary, in the embodiment depicted in the drawings each groove is identical, and for the purpose of illustration only groove 22 will be described. Groove 22 includes a base 26 and a pair of opposing side walls 28 and 30 extending from the base towards the side surface 20. One opposing side wall 28 includes an end 32 opposite the base having a first retaining surface 34. The other opposing side wall 30 includes an end 36 opposite the base having a second retaining surface 38. The first and second retaining surfaces are spaced from each other to form a groove opening 40 which extends about the periphery of plate 6.

The function of grooves 22 and 24 is to retain resilient sealing means such as wipers 42 and 44 which establish a sealed relationship between the plate 6 and the container wall 46. Two grooves and wipers are depicted. However, more or less than two grooves and two wipers can be provided, and no separate hardware such as a retaining clip is required to hold a wiper into its associated groove. Although not necessary, in the embodiment depicted in the drawings each wiper is identical, and for the purpose of illustration only wiper 42 will be described.

Wiper 42 is a solid resilient member. Without limitation, an example of a material which can be used to form wiper 42 is a silicone elastomer such as silicone rubber. As depicted by way of example in FIG. 3, wiper 42 has a first end 48, a second end 50, and a body portion 52 extending therebetween. By providing ends 48 and 50, as opposed to a closed loop, a discontinuous wiper 42 is provided which is free to rotate as described herein.

In the preferred embodiment, wiper 42 comprises a plurality of resilient members 42 as depicted by way of example in FIG. 1. Each resilient member 42 includes a first end 48, a second end 50, and a body portion 52 extending therebetween. In such embodiment, an end of each resilient member is adjacent an end of another resilient member as depicted in FIG. 1.

Wiper 42 is retained in groove 22 by first retaining surface 34 and second retaining surface 38, and protrudes from groove opening 40. The interrelationship between groove 22 and wiper 42 42 is such that a portion 52' of the wiper protruding from groove opening 40 sealingly engages inner wall 46 of the container, and a portion 54 of wiper 42 in groove 22 sealingly engages base 26 and at least one of the retaining surfaces 34, 38, when the plate is positioned in the container. Respective of such portions 52' and 54 roll upon inner wall 46, base 26 and at least one of the retaining surfaces 34, 38 when the plate is being lowered into container 4 or raised out of container 4. The same relationship exists in those instances where a single resilient member such as depicted in FIG. 3 is replaced with a plurality of resilient members such as depicted in FIG. 1. When the wiper is damaged, in those instances where a plurality of wiper elements is used in tandem as depicted in FIGS. 1, it is possible to limit replacement of a section of the wiper to the particular element which is damaged, thereby eliminating the need to replace the entire wiper when only a portion is in need of repair. In addition, a wiper is provided wherein undesirable prevention from rolling of any particular element of the wiper will not affect the rolling motion of any other element of the wiper. Such structure prevents the wiper from twisting apart and falling off of the machine during use.

Regardless of the number of resilient elements provided, it is necessary that adjacent ends either contact each other, or be only slightly spaced from each other, such that when the plate is inserted into the container each resilient element elongates where space between elements is provided, or attempts to elongate where space between elements is not provided, to an extent sufficient to effect a seal between each adjacent ends. Such structure eliminates the need to fasten one end to an adjacent abutting end. Each resilient element also swells within groove 22 to optimally engage base 26, one or both of retaining surfaces 34, 38 and inner wall 46 to effect a seal between the container 4 and plate 6. Such elongation, or attempted elongation, and swelling, are caused by the pressure exerted upon each resilient element as each resilient element is sandwiched between the plate and the container wall when the plate is within the container, and by heat in those applications where heating means such as heating elements H are provided.

Because of the elastic nature of each wiper, each wiper element can easily be removed from or inserted into a groove 22 by causing the resilient member to be compressed to such an extent as to allow it to pass through the groove opening 40. There is no need to stretch or otherwise subject the wiper to tension during installation or use. In the preferred embodiment, the first retaining surface 34 and the second retaining surface 38 extend towards each other and intersect the side surface 20 at respective first and second junctures 56 and 58. Such junctures are curved or chamfered so that a resilient member is not cut during insertion into groove 22. It is also desirable that each opposing side wall 28, 30 intersect a respective retaining surface 34, 38 at a respective third juncture 60 and fourth juncture 62, junctures 60 and 62 being curved or radiused.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. Apparatus for use in dispensing, comprising:
   a plate of material shaped to fit inside a container of dispensable material, said plate having an upper surface, a lower surface and a side surface which extends from said upper surface to said lower surface;
   at least one groove in said side surface extending around the periphery of said plate, said groove including a base and a pair of opposing side walls extending from said base towards said side surface, one of said opposing side walls having an end opposite said base including a first retaining surface, and the other of said opposing side walls having an end opposite said base including a second retaining surface, said first and second retaining surfaces being spaced from each other to form a groove opening which extends about the periphery of said plate; and,
   at least one resilient member having a first end, a second end, and a body section extending therebetween, said member retained in said groove in the absence of stretching and tension by said first and second retaining surfaces and protruding from said groove opening, the structural interrelationship between said groove and said member being such that a portion of said member protruding from said groove opening sealingly engages an inner wall of said container, (b) a portion of said member in said groove sealingly engages said base and at least one of said retaining surfaces, (c) respective of said portions of said member roll upon said inner wall, said base and said at least one of said retaining surfaces, and (d) said first end and said second end contact each other sufficiently to effect a seal therebetween by compression of said at least one resilient member, when said plate is being lowered into said container or raised out of said container.

2. Apparatus of claim 1 wherein there are a plurality of resilient members, each of said resilient members having a first end, a second end and a body section extending therebetween, each of said ends of each resilient member being adjacent one of said ends of another of said resilient members.

3. Apparatus of claim 2 wherein each of said each of said ends of each resilient member is in contact with said one of said ends of another of said resilient members.

4. Apparatus of claim 1 wherein said at least one resilient member comprises a silicone elastomer.

5. Apparatus of claim 2 wherein each resilient member of said plurality of resilient members comprises a silicone elastomer.

6. Apparatus of claim 3 wherein each resilient member of said plurality of resilient members comprises a silicon elastomer.

7. Apparatus of claim 1 wherein said plate includes a plurality of heat radiating fins extending from said lower surface.

8. Apparatus of claim 7 wherein said plate and said fins are integral.

9. Apparatus of claim 8 wherein there are a plurality of resilient members, each of said resilient members having a first end, a second end and a body section extending therebetween, each of said ends of each resilient member being adjacent one of said ends of another of said resilient members.

10. Apparatus of claim 9 wherein each resilient member of said plurality of resilient members comprises a silicone elastomer.

11. Apparatus of claim 1 wherein said first retaining surface and said second retaining surface extend towards each other, said first retaining surface intersecting said side surface at a first juncture and said second retaining surface intersecting said side surface at a second juncture, each of said first and second junctures being curved or chamfered.

12. Apparatus of claim 1 wherein each of said opposing side walls intersect a respective of said retaining surfaces at a respective third and fourth juncture, each of said third and fourth junctures being radiused or curved.

* * * * *